(12) United States Patent
Logan

(10) Patent No.: US 11,142,018 B2
(45) Date of Patent: Oct. 12, 2021

(54) CONSTRUCTION SQUARE

(71) Applicant: Brien Logan, Portland, OR (US)

(72) Inventor: Brien Logan, Portland, OR (US)

(*) Notice: Subject to any disclaimer, the term of this patent is extended or adjusted under 35 U.S.C. 154(b) by 140 days.

(21) Appl. No.: 16/593,285

(22) Filed: Oct. 4, 2019

(65) Prior Publication Data
US 2020/0307300 A1 Oct. 1, 2020

Related U.S. Application Data

(60) Provisional application No. 62/757,540, filed on Nov. 8, 2018.

(51) Int. Cl.
| | | |
|---|---|---|
| *B43L 7/12* | (2006.01) | |
| *G01B 3/04* | (2006.01) | |
| *G01B 3/56* | (2006.01) | |
| *B43L 7/02* | (2006.01) | |

(52) U.S. Cl.
CPC .................. *B43L 7/12* (2013.01); *G01B 3/04* (2013.01); *G01B 3/566* (2013.01); *B43L 7/02* (2013.01)

(58) Field of Classification Search
CPC . B43L 7/12; B43L 7/027; B43L 7/125; G01B 3/04; G01B 3/566
USPC ......... 33/452, 418, 421, 423, 434, 465, 471, 33/474, 563, 565, 566
See application file for complete search history.

(56) References Cited

U.S. PATENT DOCUMENTS

| | | | | |
|---|---|---|---|---|
| 335,293 | A * | 2/1886 | McKinney | G01B 3/56 33/421 |
| 476,683 | A * | 6/1892 | Paterson | G01B 3/56 33/421 |
| 509,292 | A * | 11/1893 | Bretz | G01B 3/56 33/341 |
| 745,271 | A * | 11/1903 | Bones | G01B 3/56 33/423 |
| 854,125 | A * | 5/1907 | Thompson | B43L 7/0275 33/474 |
| 1,699,619 | A * | 1/1929 | Muench | 33/476 |
| 2,251,208 | A * | 7/1941 | Sigmon | E04G 21/1891 33/341 |
| 2,470,035 | A * | 5/1949 | Hudkins | B43L 7/027 33/418 |
| 2,579,857 | A * | 12/1951 | Premo | B43L 13/20 33/476 |
| 2,652,629 | A * | 9/1953 | Prucker, Jr. | G01B 3/566 33/474 |

(Continued)

FOREIGN PATENT DOCUMENTS

| | | | | |
|---|---|---|---|---|
| DE | 3534223 | A1 * | 8/1986 | G01B 5/24 |
| EP | 2420795 | A1 * | 2/2012 | G01B 3/566 |

*Primary Examiner* — Christopher W Fulton
(74) *Attorney, Agent, or Firm* — Mark S Hubert

(57) ABSTRACT

An L shaped versatile, combination construction square for a carpenter having measured marks for all common framing combinations about its six sides. A series of template openings, as well as two adjustable base arms able to set angles for setting plumb, lock into a position to cut rafter tails and birds mouths as well as stair treads and risers. It has a precise scale that accommodates a traditional carpenter's rectangular 3/16 inch wide pencil lead that allows for 1/8 inch increments that can be transferred the length of a board using the adjustable arms. It also functions as a framing square and a laser angle finder.

7 Claims, 5 Drawing Sheets

(56) References Cited

U.S. PATENT DOCUMENTS

| | | | | |
|---|---|---|---|---|
| 4,503,624 | A * | 3/1985 | Whiteford | G01C 9/28 33/379 |
| 5,239,762 | A * | 8/1993 | Grizzell | B43L 7/027 33/417 |
| 5,253,426 | A * | 10/1993 | Mosbrucker | B43L 7/027 33/429 |
| 5,713,135 | A * | 2/1998 | Acopulos | G01B 3/56 33/1 PT |
| 5,727,325 | A * | 3/1998 | Mussell | B43L 7/027 33/429 |
| 6,453,568 | B1 * | 9/2002 | Hymer | G01C 15/008 33/276 |
| 6,725,559 | B2 * | 4/2004 | Burt, Jr. | A41H 3/002 33/11 |
| 7,082,692 | B2 * | 8/2006 | Shapiro | B43L 7/10 33/464 |
| 7,269,909 | B1 * | 9/2007 | Barbieri | B43L 7/12 33/419 |
| 7,958,645 | B1 * | 6/2011 | Chappell | E04D 15/00 33/476 |
| 2006/0085993 | A1 * | 4/2006 | Frankowiak | B43L 7/12 33/465 |
| 2010/0077625 | A1 * | 4/2010 | O'Morrow, Sr. | B43L 7/005 33/476 |
| 2015/0276367 | A1 * | 10/2015 | Lamanna | B25H 7/02 33/404 |

\* cited by examiner

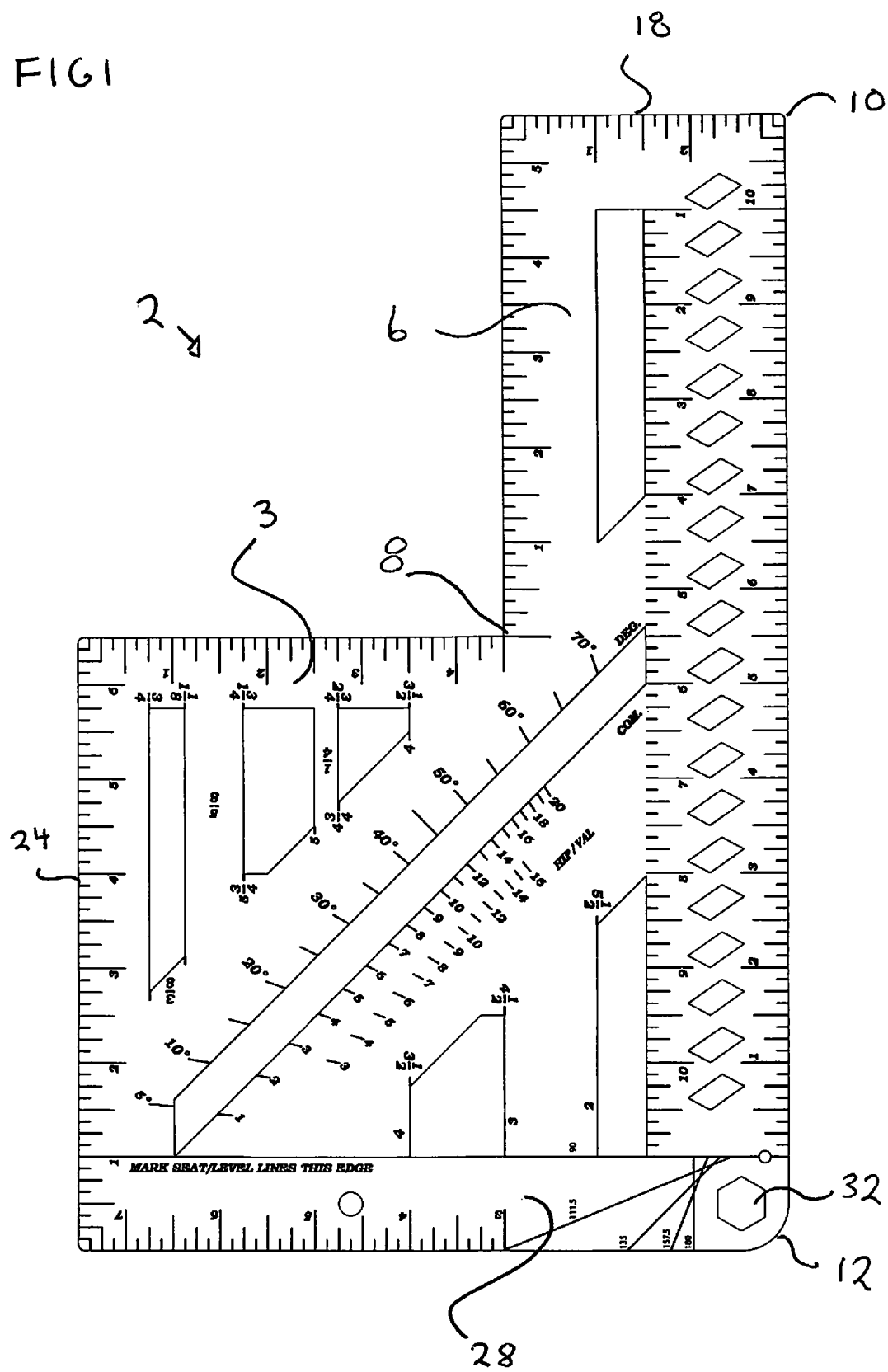

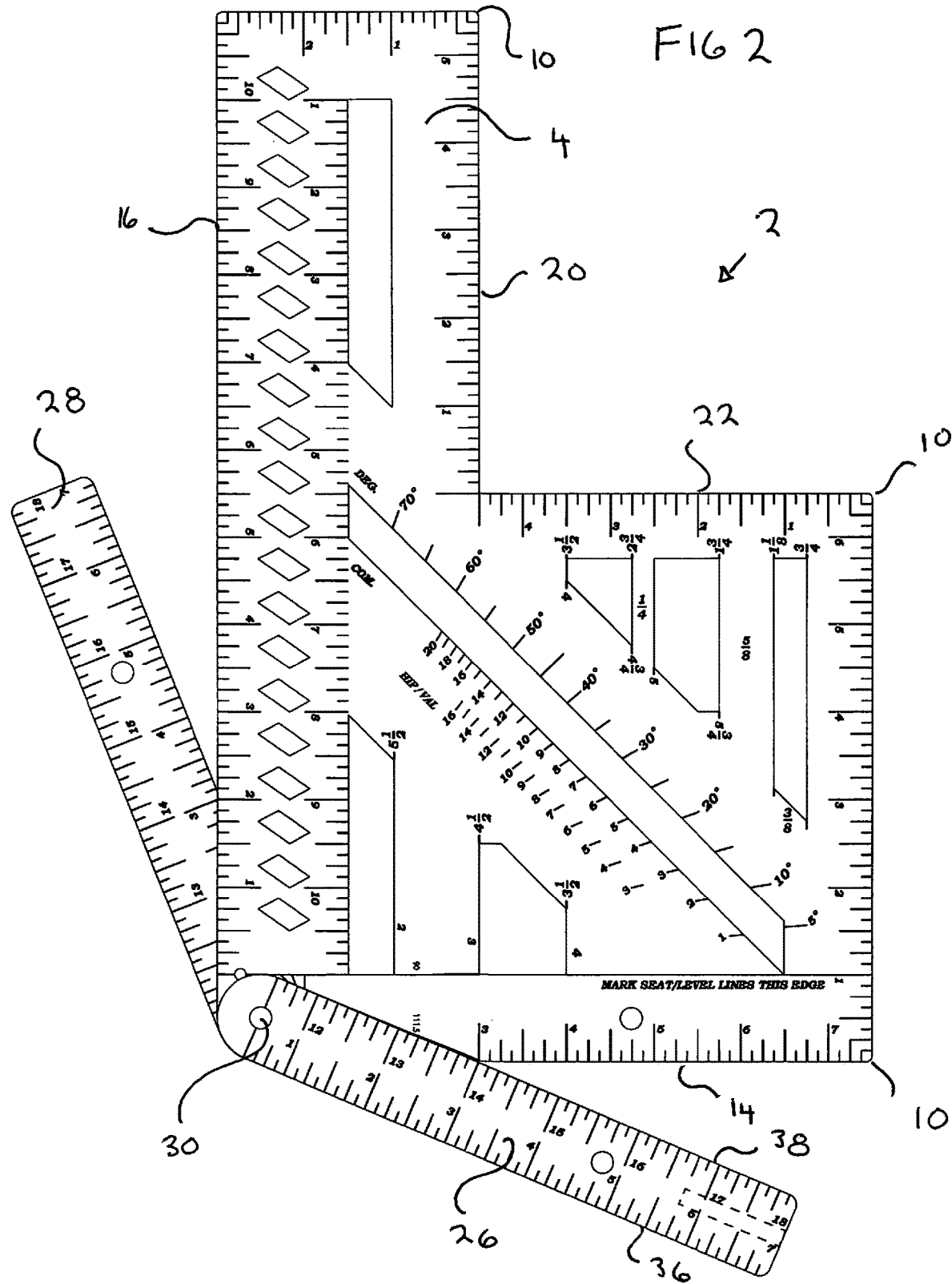

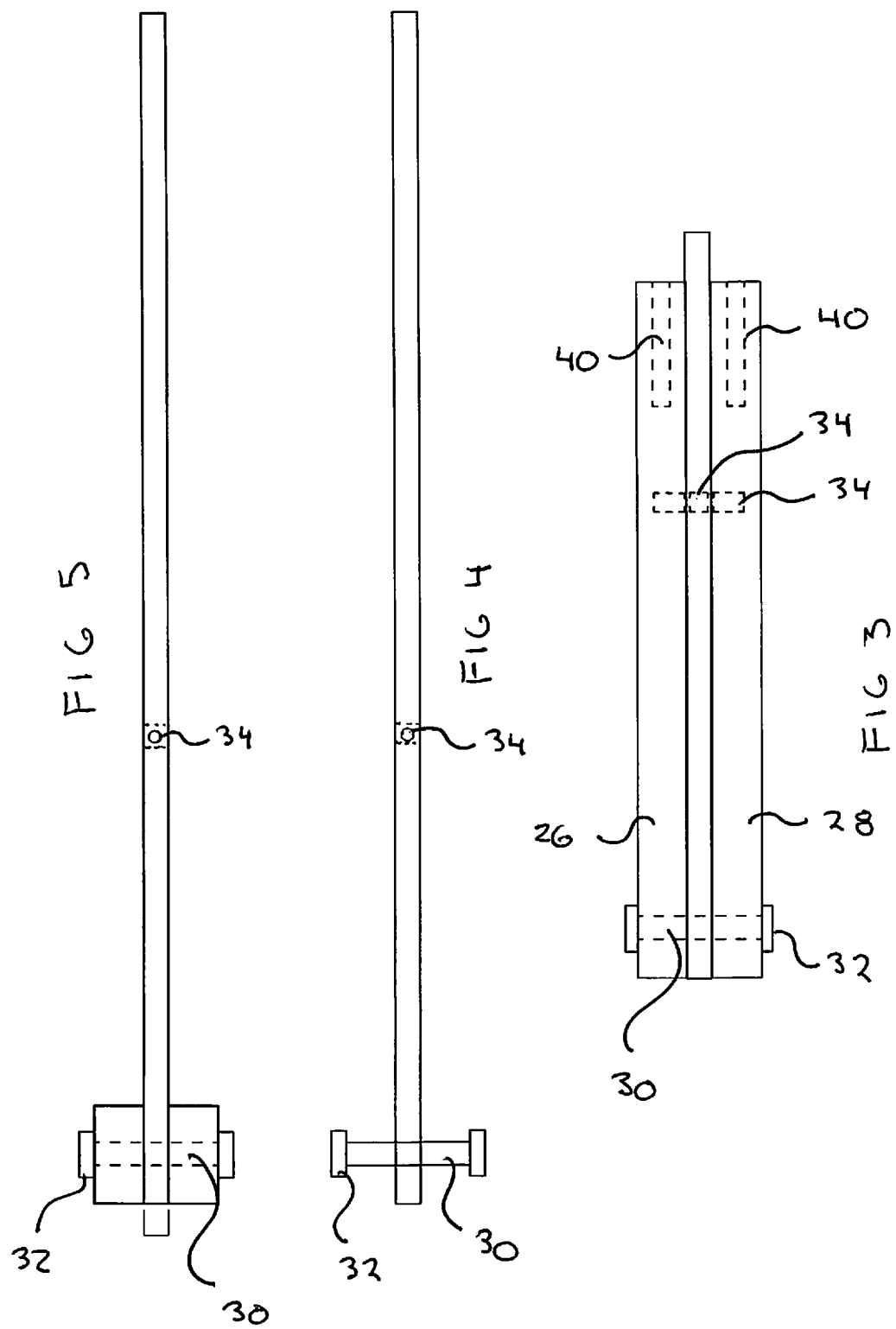

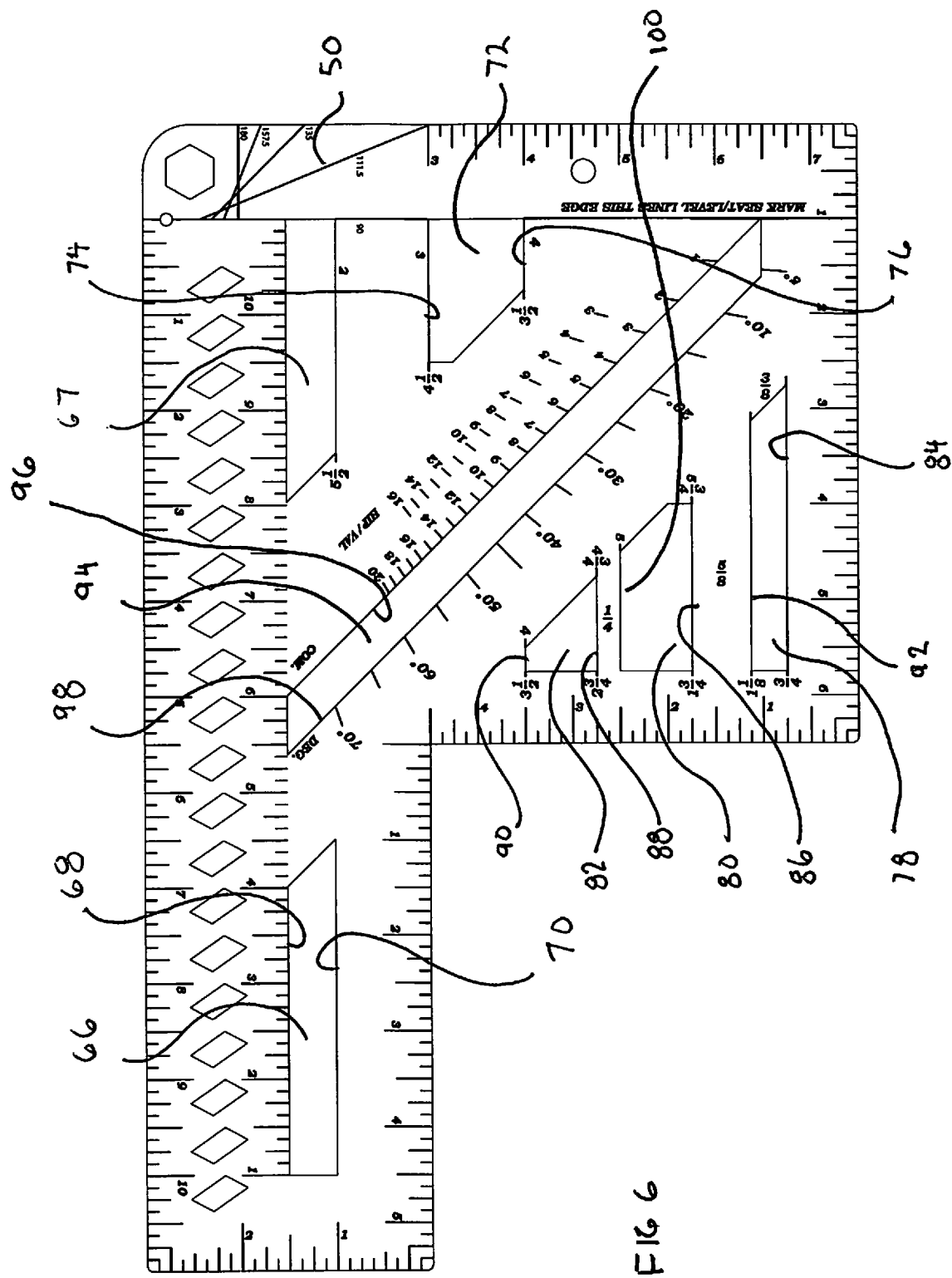

CONSTRUCTION SQUARE

CROSS-REFERENCE TO RELATED APPLICATIONS

THIS APPLICATION IS A CONTINUATION OF U.S. PROVISIONAL PATENT APPLICATION NO. 67/757,540 FILED NOV. 8, 2018, ENTITLED "MULTIFUNCTIONAL AND ADJUSTABLE CARPENTER SQUARE" INCORPORATED IN ITS ENTIRETY BY REFERENCE HEREIN.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a framing square for a carpenter and more particularly, to an adjustable template transfer plate for a plethora of common dimensions of construction material.

BACKGROUND

Carpenters and woodworkers generally work with standard dimensional lumber and build their structures to stringent dimensions as specified by building plans and standards such as the Uniform Building Code (UBC). As such, there are many repeatable dimensions that must be marked on the building surfaces, as well as others that once determined, must be repeatedly marked. Such is the case when laying out rafters, trusses or stairs. It is a considerable time saver to be able to transfer these common dimensions quickly and accurately to the work surface. It is also a considerable time saver to be able to quickly determine or mimic specific angles, plum or level (using two separately locking and separately pivotable opposing linear base arms) with respect to set framing members or conditions in the field and lock them onto a device that allows these angles to be accurately read or repeatably transferred.

Thus, a more versatile construction square with provisions for quickly marking incremental lines on boards and planar, substrate goods, is provided by the embodiments set forth below.

Henceforth, a combination construction square that is designed for use with a carpenter's pencil would fulfill a long felt need in the construction industry. This new invention utilizes and combines known and new technologies in a unique and novel configuration to overcome the aforementioned problems and accomplish this.

BRIEF SUMMARY

In accordance with various embodiments, a carpenter's construction square that accommodates a standard carpenter's pencil through all of the dimensional openings is provided.

In one aspect, a carpenter's construction square, visibly marked in contrasting colors on a waterproof frame is provided.

In another aspect, a carpenter's construction square with two, separately locking, and separately pivotably opposing linear base arms that may be used to determine or replicate angles, or for marking transfer lines.

In yet another aspect, a carpenter's construction square with a series of marking openings that accommodates a standard carpenter's pencil to make ⅛-inch incremental lines, resides adjacent to a linear scale running along the longest linear edge of the body.

In yet another aspect, a carpenter's construction square with a series of angle markings coincident with the angles that the linear arms pivot through.

In another aspect, a carpenter's construction square with a plethora of transfer openings set for the thicknesses and widths of the most common dimensional materials as well as for the common combinations of common dimensional lumber and sheet goods.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 1 is a rear view of the construction square with the two base arms locked in the squared position;

FIG. 2 is a front view of the construction square with the two base arms locked at different angles;

FIG. 3 is a bottom view of the construction square with the two laser emitting lights, the locking pivot pin and the magnetic aligners shown in phantom;

FIG. 4 is a side view of the construction square with the two base arms removed;

FIG. 5 is a side view of the construction square with the base arms locked in the squared position and the locking pivot pin in phantom;

FIG. 6 is a back view of the construction square designating the various scribe openings and scales on the body of the construction square.

DETAILED DESCRIPTION OF CERTAIN EMBODIMENTS

Figure 7:
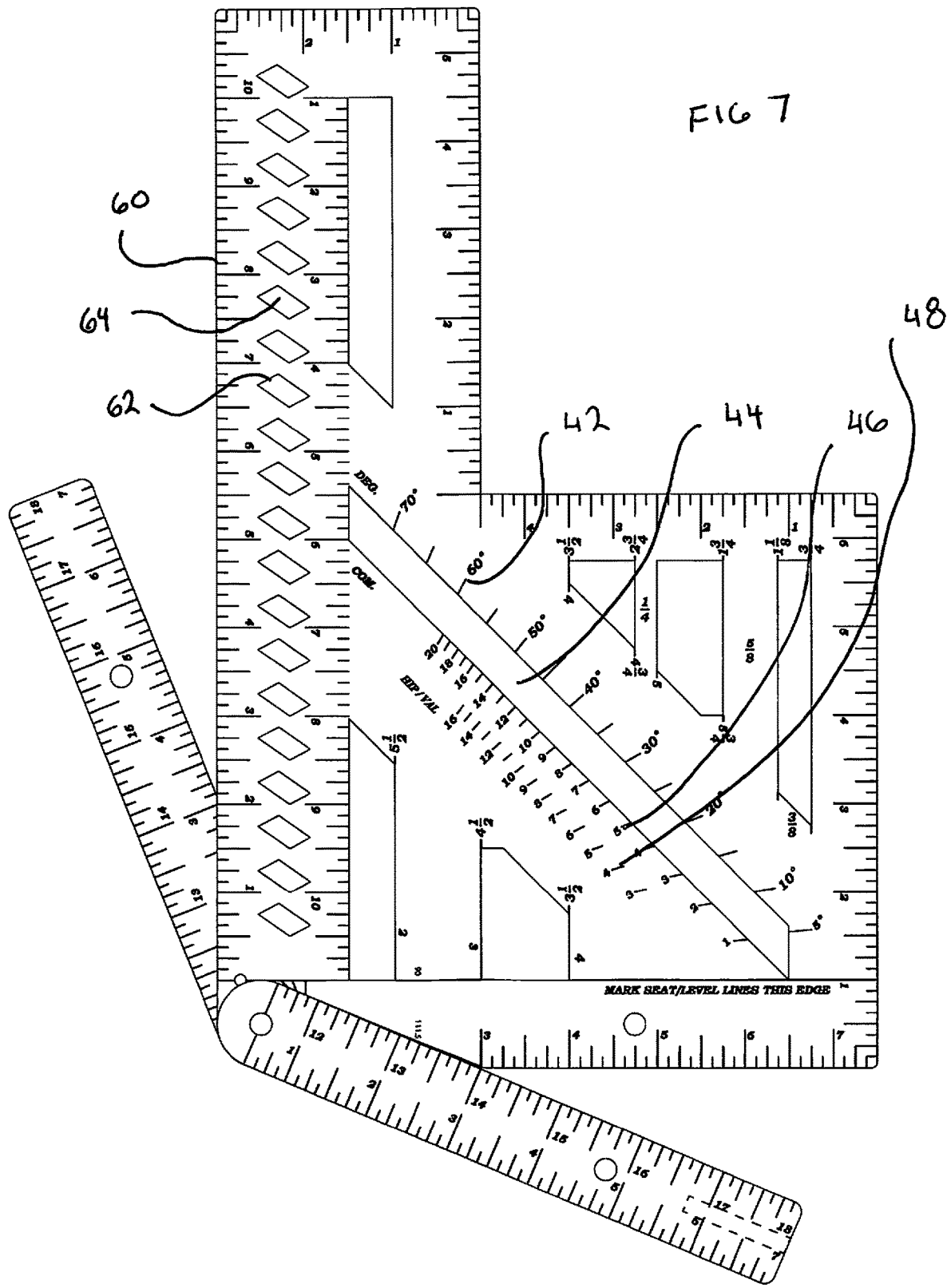
FIG. 7 is a front view of the construction square designating the various scribe openings and scales on the body of the construction square.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept.

It will be understood that, although the terms first, second, etc. may be used herein to describe various elements, these elements should not be limited by these terms. These terms are only used to distinguish one element from another. For example, a first linear arm could be termed a second linear arm, and, similarly, a second linear arm could be termed a first linear arm, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," being considered non-exclusive. Also, terms such as "element" or "component" encompass both elements and components comprising one unit and elements and components that comprise more than one unit, unless specifically stated otherwise.

As used herein, the term "carpenter's pencil" refers to a pencil with a compressed 1/8-inch×3/32 graphite lead rectangular cylinder, clad with a rectangular 19/32-inch×5/16-inch wooden exterior sheath. These carpenter's pencils are generally sharpened with a razor knife such that the exposed lead section remains rectangular to a height of about 3/8 inch or so.

The present invention relates to a novel design for a planar construction square used by a carpenter or woodworker. Its novelty lies in both the comprehensive amount of transfer marking openings established for working with dimensional framing members (construction materials) and the UBC, as well as the ability to establish and set scribe angles specific to any job. It quickly allows the scribing of lines both parallel and perpendicular to the edge of the dimensional lumber. The markings for all angles, scales, rulers and scribe openings are clearly labeled through a method wherein material is removed in parallel, narrow grooves from the body and base arms of the construction square 2 and a high-contrast color with respect to the color of the body 3 is introduced into/onto these narrow grooves. Preferably these grooves are cut by lasers.

Looking at FIGS. 1 and 2 it can be seen that the construction square 2 has a planar "L" shaped body 3 with a front face 4, a substantially similar back face 6, six exterior or perimeter edges, one inside 90-degree corner 8, four outside 90-degree corners 10 and one rounded corner 12. The "L" shaped body is formed from a 7.5 inch by 6.5 inch rectangle with a 5.5 inch long by 3 inch section extending normally from the corner of the square. These inside and outside corners allow the user to make external measurements (about the exterior of the square 2). This can be done by butting any of the edges of the square 2 at the corners of structures of varying depths to be able to measure, mark or check for squareness. The six exterior edges are designated as follows: the short base edge 14, the long base edge 16, the top edge 18, the inside upper edge 20, the inside lower edge 22 and the side edge 24.

Notably, the inside upper edge 20 is the length of a standard 2×6 board and the length of the short base edge 14 is the length of a standard 2×8 board and the distance of the side edge above the base arms is 6½ inches. The body of the construction square is ¼ inch thick and the base arms are each ½ inch thick. The base arms have a height of 1 inch.

The short base edge 14 is parallel to both the top edge 18 and the inside lower edge 22. The length of the short base edge 14 also equals the sum of the top edge 18 and the inside lower edge 22. The long base edge 16 is parallel to the side edge 24 and the inside upper edge 20. The length of the long base edge 16 also equals the sum of the side edge 24 and the inside upper edge 20. There are also seven scribe openings formed through the body 3 of the square 2. Each of these openings are either four or five sided. These scribe openings each have two opposing sides (designated top or bottom edges) that are parallel to both the long base edge 16 and the side edge 24. Reference dimensions are marked on the front face 4 and back face 6 of the square 2. These reference dimensions are measurements taken between either the long base edge 16 and the two opposing sides of a scribe opening, or are taken between the side edge 24 and the two opposing sides of a scribe opening. Thus, the square can be flipped or rotated to achieve the different spacings and still be readable. Placing the long base edge 16 or the side edge 24 aligned with the desired location for measurement or marking will most likely reveal a side of a scribe opening that matches the desired dimension. The exterior edges have lengths that correspond to standard dimensions for the framing members or combination of framing members commonly found in construction. Since the base arms pivot and may be locked parallel with the long base edge 16 or parallel with the short base edge 14, there are two different measurements the short base edge 14 and the long base edge 16 can provide taking into consideration the one inch width of the base arms. These exterior edge lengths are disclosed in the following table:

| Square Edge | Length of Edge | Dimensional Lumber Equivalent Dimensions |
|---|---|---|
| Short base | 7½ in<br>6½ in from base arm | 2 × 6 with 1⅛ in T&G flooring |
| Long base | 12 in<br>11 in from base arm | 2 × 8 with 1⅛ in plywood or 1¼ in OSB |
| Top | 3 in | Double 2 × 4 stud thickness |
| Inside Upper | 5½ in | Width of a 2 × 6 stud |

-continued

| Square Edge | Length of Edge | Dimensional Lumber Equivalent Dimensions |
| --- | --- | --- |
| Inside lower | 4½ in | 2 × 4 with 1 in T&G flooring or 1 in plywood |
| Side | 6½ in 5½ in from base arm | 2 × 6 with 1 in T&G flooring or 1 in plywood Width of a 2 × 6 stud |

Pivotally disposed at the rounded corner 12 between the short base edge 14, and the long base edge 16 is a front face base arm 26 and a back face base arm 28. These pair of base arms are substantially similar in length, width, thickness and surface adornment. In the preferred opening these arms are ½ inch thick, one inch wide and six inches long. Each base arm is a linear ruler having two dimensional linear scales on each of its two faces. The linear scales bear the same dimensional units, except they run in opposite directions from their ends. I.E. one linear scale begins at the distal end and one linear scale begins at the proximal end. At the distal ends of the two base arms are orifices that align with a threaded stud 30 embedded into the corner of the body 3 when their bottom edges reside flush and parallel with the short base edge 14 and their top edges simultaneously reside perpendicular to the long base edge 16. (See FIG. 3) Onto this threaded stud 30 are threadingly engaged locking nuts 32 that tighten to secure the base arms in any of the 360-degree positions it may rotate through with respect to the body 3. (In the preferred embodiment the stud 30 and the locking nuts 32 are brass to prevent corrosion.) It is envisioned that alternate embodiments may utilize spacers to enhance the rotation or locking of the two base arms as is well known in the field.

Establishing these base arms 26/28 in either of the perfect square positions is simplified as there are magnets 34 (or ferromagnetic disk and magnet combinations) imbedded in the body 3 and the base arms 26/28 that direct and forcibly retain the bottom edge 36 and the top edge 38 of the base arms in perfect perpendicular alignment with the short base edge 14 or the long base edge 16 of the body 3 without locking.

The base arms 26/28 may each or both be rotated and locked so that their bottom edges 36 reside parallel and coplanar to the long base edge 16. This will make an 18-inch-long ruler. Similarly, the base arms 26/28 may each or both be rotated and locked so that their top edges 38 reside parallel and coplanar to the short base edge 14. This will make a 13½-inch-long ruler.

Imbedded into the base arms are laser pointers 40 that shine a laser light beam parallel with the top and bottom edges of the base arms. This can be used to determine the angles precisely between framing members large distances apart. The long base edge 16 may be placed on one framing member with the line of the bottom edge of the base arm at the point where one end of the connecting framing member is to rest, and the laser pointer turned on and the laser point aimed to the point where the other end of the connecting framing member is to be installed. The base arm may be locked in place and the angle for the cuts on the ends of the connecting member can be determined reading the upper angular scale 42 of the 45-degree parallelogram scribe opening 44. This angle can also be transferred and scribed with pencil on the connecting framing member using the top or bottom edge of the base arm while still locked in this position. (See FIG. 7)

In a similar fashion, rafter/truss angles can be determined using common rafter lengths on the pitches of roofs scale 46 below the 45-degree scribe parallelogram 44 and the hip and valley scale 48 below the common rafter lengths scale 46. The pitch of a roof can be determined by placing the long base edge 26 along the top edge of the rafter/truss and loosening the locking nut 32 so the base arm swings freely with gravity, then reading the plumb angle displayed on the upper angular scale 42 at the top edge of the base arm. (See FIGS. 6 and 7)

Without using the laser lights 40, common angles of 111.5, 135, 157.5 and 180 degrees may be set by aligning the top edge of the base arms with the appropriate angle of the obtuse angle scale 50 on the short base edge 14. There are four different angular scales about the body of the square 2.

The external measurements as discussed above (I.E. those made with linear scales on the six sides) may be made by abutting any of the six edges against the surface to be marked or measured or by direct placement of the long base edge 16 of the square 2 with the base arm extending perpendicularly from the short base edge 14. They may also be made at 90-degrees to the framing member with the base arms locked perpendicular to the long or short base edges to make a speed square. Lastly, the exterior measurements can be made with the base arms locked at an angular position.

Internal measurement checks and scribes may be accomplished using different sides of the plurality of scribe openings through the body 3. There are seven individual scribe openings, four are trapezoids, one is a parallelogram and two are non-symmetrical pentagons. Since none of the scribe openings are centered in the body, the internal sides of the scribe openings each bear two different dimensional numbers. One designating the distance from the internal side of that scribe opening to the long base edge 16 and one designating the distance from the internal side of that scribe opening to the side edge 24. These seven scribe openings are arranged into three groupings: the siding and door jamb scribes 66, 67 and 72; the general framing scribes 78, 80 and 82, and the diagonal scribe 94. (See FIGS. 6 and 7)

Looking at FIGS. 6 and 7, the siding and door jamb scribes 66 and 67 are irregular trapezoids with the parallel sides of their opening, parallel to the long base edge 16. They are ½ inch wide and their top side 68 begins 1½ inches from the long base edge 16. Their purpose is to provide scribe marks for the thickness of a 2×4 (1½ inches) and sheet of ½ inch thick sheathing (2 inches total) when the long base edge 16 is placed where the wall is to begin. They also serve a second scribe feature for marking the width of a 2×6, as the distance from their bottom sides 70 to the side edge 24 is 5½ inches. The last feature for this scribe opening group is for marking the top and or bottom wall plates for window and door king studs, cripple studs and trimmers. Here, 2×4/6/8 studs of various heights are nailed together to provide enhanced vertical support for window and door spans. The distance from the long base edge 16 to the top side 68 is that of a king stud (1½ inches) and the distance from the long base edge 16 to the top side 74 of the large irregular pentagon 72 is that of a cripple stud placed next to the king stud (3 inches). The remaining 1½ inches beside the cripple stud for the trimmer is marked by using the 3-inch width of the arm of the body between the long base edge 16 and the inside upper edge 20 aligned on the scribe mark for the king stud. Additionally, the distance from the bottom side 76 of the of the large irregular pentagon 72 to the side edge 24, is that of the width of a 2×4 (3½ inches). Lastly, the distance from the side edge 24 to the top side 74 of the large irregular pentagon 72 is the halfway between the width of a 2×4 and a 2×6 (4½ inches) or width of interior door jamb.

The general framing scribes 78, 80 and 82 are a grouping of three stacked scribe openings as follows: a bottom opening of which is ⅜ of an inch wide with a bottom side 84 that is ¾ inches from the side edge 24 (a common sheet goods thickness and ½ the thickness of a 2×4), and its top side 92 at 1⅛ inches from the side edge 24 (a common floor sheeting thickness); a middle opening which is ¾ inches wide with its bottom side 86 at 1¾ inches from the side edge 24 (½ of the width of a 2×4); and a top opening 82 with its bottom side 88 at 2¾ inches from the side edge 24 (½ the thickness of a 2×6), and its top side 90 at 3½ inches from the side edge 24 (the width of a 2×4). Measuring the distance from the long base edge 16 to the top and bottom sides of the top opening and middle opening provides scribe lines of 4, 4¾, 5 and 5¾ inches. These represent combinations of dimensional lumber and sheet goods that may infrequently but eventually be used.

The diagonal scribe 94 presents two parallel scribe sides 96 and 98 that lie at 45 degrees to all of the six body edges. It is a parallelogram where the included angles between the interior sides are 45 and 135 degrees.

The space between the top side of the lowest opening 92 and the bottom side of the middle opening 86 is ⅝ of an inch (a common sheet goods thickness) and the distance between the top side of the middle opening 100 and the bottom side of the top opening 82 is ¼ inch (a common sheet goods thickness)

There is also a series of repeating identical parallelogram openings (the incremental scribing series) 62 arranged in a linear fashion with its linear axis parallel and adjacent to the dimensional linear scale running along the long base edge 16. These repeating identical parallelogram openings 62 are sized to accept a standard carpenter's pencil when sharpened to expose at least 3/16 of the lead. The parallelograms of the incremental scribing series are intended to allow the scribing of a line parallel to the edge of a framing member when the base arms are locked perpendicular to the long base edge 16 and the square 2 can be slid along the edge of the framing member. The individual parallelograms 64 are arranged such that their four interior corners constitute a series of points that when transferred along a line perpendicular to the linear axis of the series would be ⅛ of an inch apart. Note that this linear axis of the series is perpendicular to the short base edge 14. A carpenter's pencil can be inserted into the parallelogram and angled such that the lead goes into any of the corners and the square sild with its base arms parallel to the short base edge and in contact with the edge of a framing member to as to make a line that is parallel to the edge of the framing member. This line can be selected in ⅛-inch increments from ½ inch to 10½ inches by using the appropriate corner of the appropriate parallelogram opening. The parallelogram 64 in the preferred embodiment has its long sides approximately 7/16 in long (+/−1/16 in) and its short sides approximately ¼ in long (+/−1/16 in). The included angles of the parallelogram are approximately 60 degrees (+/_5 degrees) and 120 degrees (+/−5 degrees).

Explained differently, the incremental scribing series 62 is a linear series of equally spaced parallelogram openings ⅛ of an inch apart, having a linear axis parallel to the long base edge with each parallelogram opening oriented such that each of its corners is at a unique distance ⅛ of an inch incrementally further from a distance any other said corner in said parallelogram opening is from the long base edge.

The construction square is an L shaped body with seven internal scribe openings, four angular scales on each face of the body, six linear scales disposed about the exterior edges of each face of the body, four linear scales on each of the two base arms, an incremental scribing series parallel to the longest side of the square, and two individual, pivoting base arms. The plurality of openings when the square 2 is flipped and rotated, provide most conceivable measurements of dimensional lumber, sheet goods, and combinations thereof that can be transferred to the worksite materials. Angles can be measured and set using the base arms with or without the laser allowing rafter tails and stair risers to be precisely cut. With the use of two base arms that lock independently, birds mouths and outer complex angle cuts can be transferred without moving the square 2 or using other tools. It may be used to determine plumb or as a "speed square" that is capable of spanning up to 2×12 lumber without connecting lines. Perhaps most importantly, lines parallel to the edge of the dimensional lumber or sheet goods may be quickly and accurately made in ⅛ in increments.

The construction square may be manufactured out of a steel or metal (preferably aluminum) or a polymer or composite material. Its surface may be treated by such means as anodizing, oxide passivation, staining or painting to enhance the visibility of both the square (to prevent loss) and to enhance the contrast between the square and the markings on the square. The linear scales preferably will be in inches however alternate embodiments may utilize the metric system or may have one face marked with each.

In the preferred embodiment, the body has a thickness of ¼ inch, and each base arm may have a thickness of ½ inch. A benefit of having a thicker base arm is for its ease to hook onto surfaces. Although depicted with two base arms, an alternate embodiment may utilize but one base arm.

In the above description, for the purposes of explanation, numerous specific details are set forth in order to provide a thorough understanding of the described embodiments. The detailed description and accompanying drawings are intended to be illustrative only, and should not be taken as limiting the scope of the inventive concept. While certain features and aspects have been described with respect to exemplary embodiments, one skilled in the art will recognize that numerous modifications are possible.

No single feature or features of any described embodiment should be considered essential to every embodiment of the invention, as other embodiments of the invention may omit such features. What is claimed as the invention, therefore, is all such modifications as may come within the scope and spirit of the following claims and equivalents thereto.

Having thus described the invention, what is claimed as new and desired to be secured by Letters Patent is as follows:

1. A compound square for a framing carpenter or woodworker, comprising:
   a planar body having a front face, a back face and six edges defining an inside corner and five outside corners;
   wherein each of said six edges has a graduated linear scale marked on said front face and said back face;
   a single row linear series of parallelogram openings equally spaced ½ of an inch apart, with a linear axis parallel to at least one of said graduated linear scales, and wherein there is a ⅛ inch distance between nearest corners of adjacent said parallelogram openings in said linear series of parallelogram openings wherein said parallelogram openings have interior angles of approximately 60 degrees and approximately 120 degrees and have sides approximately 7/16 of an inch and approximately ¼ of an inch in length.

2. A compound square for a framing carpenter or woodworker, comprising:
- a planar body having a front face, a back face and six edges defining an inside corner and five outside corners;
- wherein each of said six edges has a graduated linear scale marked on said front face and said back face;
- at least one linear, graduated arm pivotally affixed at a corner of said planar body;
- at least one opening formed through said planar body, said opening having a pair of opposing sides each residing parallel to at least two of said six edges;
- a single row, linear series of parallelogram openings equally spaced ½ of an inch apart, having a linear axis parallel to at least one of said graduated linear scales, and wherein there is a ⅛ inch distance between nearest corners of adjacent said parallelogram openings in said linear series of parallelogram openings;
- wherein said parallelogram openings have interior angles of approximately 60 degrees and approximately 120 degrees and have sides approximately 7/16 of an inch and approximately ¼ of an inch in length.

3. The compound square of claim 2 wherein the number of linear, graduated arms is two with a first arm pivotally affixed at said corner on said front face and a second arm pivotally affixed at said corner on said back face.

4. The compound square of claim 2 wherein said parallelogram openings have four inside corners, said parallelogram openings oriented such that each of said inside corners is ⅛ of an inch from at least one other inside corner in said parallelogram opening as measured along said graduated linear scale on said at least one parallel edge.

5. The compound square of claim 2 further comprising;
- a laser light emitting device affixed to at least one of said linear graduated arms wherein said laser light emitting device emits a laser light having a linear light axis that is colinear with a linear axis of said linear graduated arm.

6. The compound square of claim 2 wherein
- said six edges are a long base edge, a short base edge, a top edge, a side edge, an inside upper edge and an inside lower edge; and
- wherein said long base edge, said side edge and said upper inside edge are parallel; and
- wherein said inside lower edge, said short base edge and said top edge are parallel and said inside lower edge, said short base edge and said top edge are perpendicular to said long base edge, said side edge and said upper inside edge.

7. The compound square of claim 2 wherein at least one opening formed through said planar body has two parallel sides that reside at an angle that is forty five degrees from all said six edges.

* * * * *